United States Patent
Beghelli

(10) Patent No.: US 10,531,538 B2
(45) Date of Patent: Jan. 7, 2020

(54) APPARATUS AND METHOD FOR REMOTE CONTROL OF LIGHTING EQUIPMENTS

(71) Applicant: Beghelli S.p.A., Valsamoggia (IT)

(72) Inventor: Gian Pietro Beghelli, Valsamoggia (IT)

(73) Assignee: Beghelli S.p.A., Valsamoggia (IT)

( * ) Notice: Subject to any disclaimer, the term of this patent is extended or adjusted under 35 U.S.C. 154(b) by 0 days.

(21) Appl. No.: 16/076,336

(22) PCT Filed: Feb. 1, 2017

(86) PCT No.: PCT/IT2017/000019
§ 371 (c)(1),
(2) Date: Aug. 8, 2018

(87) PCT Pub. No.: WO2017/138029
PCT Pub. Date: Aug. 17, 2017

(65) Prior Publication Data
US 2019/0045601 A1 Feb. 7, 2019

(30) Foreign Application Priority Data

Feb. 8, 2016 (IT) .......... 102016000012703
May 9, 2016 (IT) .......... 102016000047558

(51) Int. Cl.
*H05B 37/02* (2006.01)
*H02J 9/02* (2006.01)
*H05B 33/08* (2006.01)

(52) U.S. Cl.
CPC .......... *H05B 37/0227* (2013.01); *H02J 9/02* (2013.01); *H05B 33/0854* (2013.01); *H05B 37/029* (2013.01); *H05B 37/0272* (2013.01)

(58) Field of Classification Search
CPC .......... H05B 37/0227; H05B 33/0854; H05B 37/029; H05B 37/0272
See application file for complete search history.

(56) References Cited

FOREIGN PATENT DOCUMENTS

| CN | 102577622 | 7/2012 |
|---|---|---|
| CN | 102694595 | 9/2012 |

(Continued)

OTHER PUBLICATIONS

International Search Report and the Written Opinion dated May 30, 2017 From the International Searching Authority Re. Application No. PCT/IT2017/000019.(13 Pages).

(Continued)

*Primary Examiner* — Douglas W Owens
*Assistant Examiner* — Jianzi Chen

(57) ABSTRACT

An apparatus (11) for the remote control of lighting apparatuses, in particular emergency lighting apparatuses (12), comprising a transmitter apparatus provided with at least one white light source having controlled activation, a receiver device used as a receiver of digital optical signals (16), which integrates a control, programming and management system managed by a software program (14), and a lighting apparatus (12), which incorporates a receiving circuit comprising a receiver photosensor (13); the transmitter apparatus is constituted by a smartphone (11), which actuates optical commands directed at the lighting apparatus (12), in a form of encoded luminous messages or intensity- and duration-controlled sequences of light variations according to a specific optical code and at different levels of luminosity, by means of a modulating process of the switching-on and the switching-off of the light source integrated in said smartphone (11).

20 Claims, 12 Drawing Sheets

(56) References Cited

FOREIGN PATENT DOCUMENTS

| | | |
|---|---|---|
| CN | 104039040 | 9/2014 |
| CN | 104041190 | 9/2014 |
| WO | WO 2013/108166 | 7/2013 |
| WO | WO 2015/121154 | 8/2015 |
| WO | WO 2017/138029 | 8/2017 |

OTHER PUBLICATIONS

International Search Report and the Written Opinion dated Sep. 30, 2016 From the Ministerio Dello Sviluppo Economico Direzione Generale Sviluppo Produtivo e Competitiveta Ufficio Italiano Brevetti Marchi Re. Application No. ITUB20160571. (7 Pages).

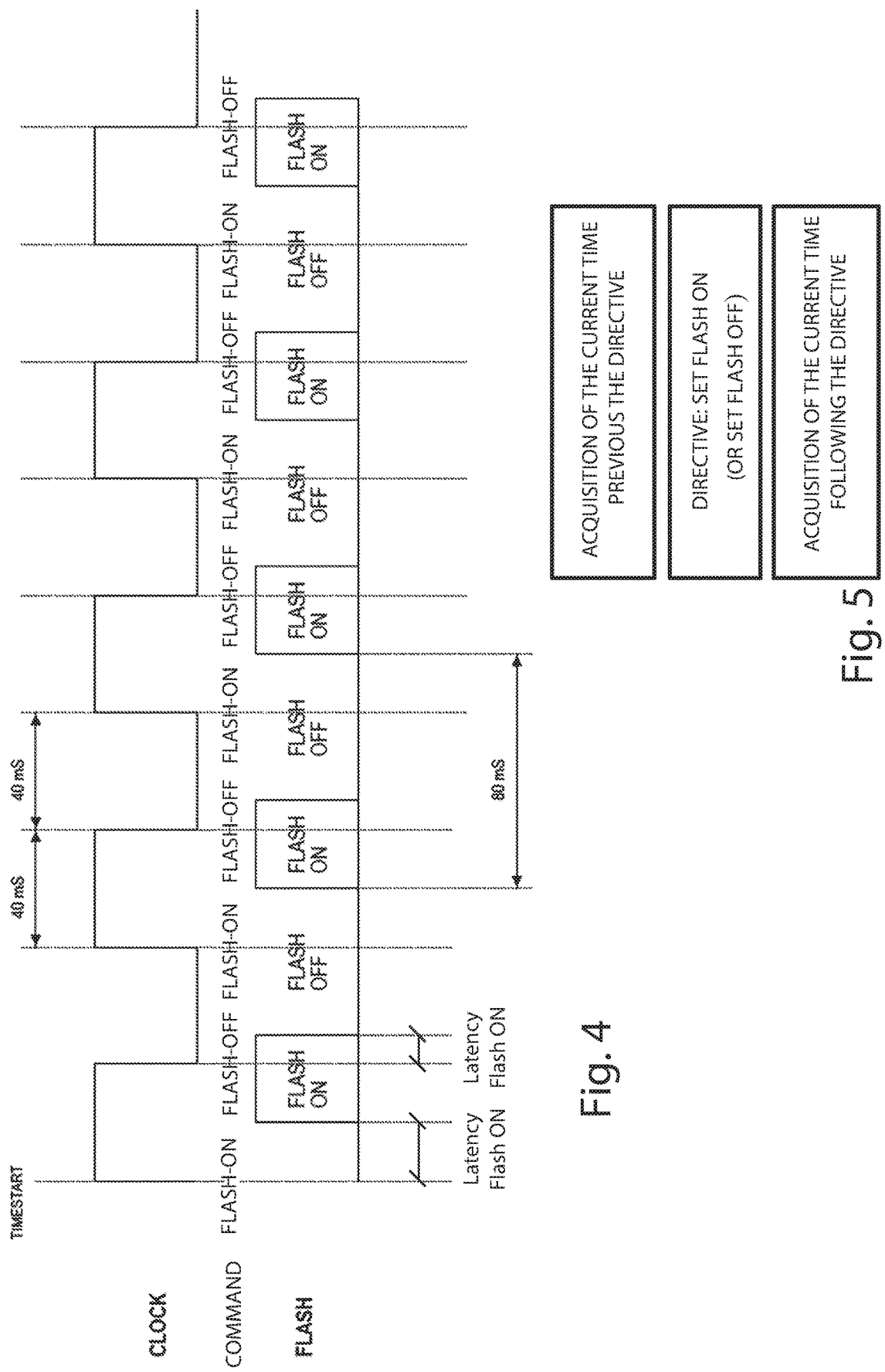

APPARATUS AND METHOD FOR REMOTE CONTROL OF LIGHTING EQUIPMENTS

RELATED APPLICATIONS

This application is a National Phase of PCT Patent Application No. PCT/IT2017/000019 having International filing date of Feb. 1, 2017, which claims the benefit of priority of Italian Patent Applications Nos. 102016000012703 filed on Feb. 8, 2016, and 102016000047558 filed on May 9, 2016. The contents of the above applications are all incorporated by reference as if fully set forth herein in their entirety.

FIELD AND BACKGROUND OF THE INVENTION

The present invention relates in general to an apparatus and the relative method for the remote control of lighting apparatuses, in particular emergency lighting apparatuses.

More specifically, the invention relates to an apparatus which uses components (diodes, LEDs, displays, cameras and light sensors) integrated in smartphones for communicating (interrogating and/or programming) with the lighting apparatus, and in particular an emergency lighting apparatus, and, further, for managing a maintenance logbook of systems on "cloud" technology in respect of the technical rules and the applicable provisions of the law; in this way it is possible to carry out an immediate and detailed diagnosis of any fault in the apparatus and immediately and automatically send a request for a maintenance intervention and/or exchange parts.

The technical solution of the invention provides for the emergency lighting apparatus to be provided with a suitable light sensor, an internal decoding circuit and an optical manifold for directing so that it can be controlled by means of an appropriately regulated and constituted luminous signal coming from a smartphone, which in turn is controlled, in some functions, by a special application program.

The emergency lighting apparatus further integrates an LED module subject to the control of a logical circuit so as to generate digital optical signals directed towards a receiver apparatus and captured thereby by means of the optical devices integrated therein.

With the aim of interpreting the potentialities of the invention presented herein in relation to the emergency lighting apparatus, it is stressed that these devices are intended for the safety of persons and are indispensable for regulating the exit thereof from places in cases of emergency situations and danger caused, among other things, by the failure of the usual lighting system.

The proper state of serviceability thereof is therefore a critical element which must be ensured by regular periodic maintenance and also by periodic checks which allow keeping the overall status under control.

For this purpose, over time automatic systems have been developed that are able to carry out the tests according to predetermined schedules following commands set up by centralised and remote control points.

However, there are frequently situations in which the systems are made, for various reasons, with traditional emergency lighting apparatuses, i.e. without self-diagnosis instruments, and in which the checking of the functionality thereof, and therefore the safety of the systems, is carried out manually by the person responsible for the system or a person appointed thereby.

The tests for checking the functioning of the emergency lighting apparatuses of the self-powered sort, i.e. with an incorporated on-board battery, are generally performed with the following procedures:

a test carried out using a button external to the apparatus; this test includes inserting a test button (NC) on the power supply line of the apparatus, so as to forcedly cause a network failure and consequent switching-on of the apparatus;

a test carried out with a button on board the product; the button is positioned on the body of the apparatus, sometimes below a protective cap, and the operator has to activate it directly or, if possible, with the aid of an actuator such as a shaft;

a test carried out using a "REED" electromagnetic command; the test is carried out by activating an electromagnetic button positioned inside the product, in proximity of the external surfaces of the casing, and, as in the preceding case, is directly actuated;

a test carried out by radio command; in this case, a radio signal is sent to the apparatus using a remote control and since the apparatus is provided with a special decoding and actuating circuit, it carries out the command to execute the test;

a test carried out using an infrared command device; the functioning is similar to the case of control with a radio command.

However, all the procedures described to this point are still impractical and/or expensive, as the tests are manually carried out and the execution times are significant; further, they require specific system parts for performing the simple test function, as well as the skill of specialised operators for carrying out the tests, and, in a case of a test being carried out on apparatuses with local diagnosis, for understanding the significance of the visual signals of the test results sent by the apparatus (typically by means of coloured LEDs).

Furthermore, the test procedures described above do not include the possibility of making information on the apparatus status available to the user.

SUMMARY OF THE INVENTION

The aim of the present invention is to make an apparatus for the remote control of lighting apparatuses, typically emergency apparatuses, which allows programming and/or interrogating and programming the above-mentioned apparatuses practically and economically, without any need for implementing manual operations on the lighting apparatus itself, by making use of common, programmable remote devices provided with active components (able to generate and receive optical signals), such as for example the communication devices known as smartphones.

A further aim of the invention is to make an apparatus for the remote control of emergency lighting apparatuses, which allows managing a maintenance logbook of the systems in respect of the existing regulations.

A further aim of the present invention is to make an apparatus for the remote control of emergency lighting apparatuses which among other things, allows instantly initiating the diagnosis procedure and/or varying the programming in terms of functioning procedures and/or direction; the proposed innovation further allows interrogating the lighting apparatus on the functioning status thereof, acquiring functional parameters, detecting any possible faults and allowing the lighting apparatus to automatically send the request for replacement parts necessary and/or to suggest that the operator carry out any maintenance operations.

A further aim of the invention is to establish a method for the remote control of emergency lighting apparatuses, which allows carrying out checks and periodic maintenance of the apparatus more rapidly, with greater safety and with greater precision, with respect to the prior art.

A further aim of the invention is to optimise reception of the light commands sent by means of the smartphone flash, so as to obtain extreme facility of use and a broad spectrum of use, while reducing environmental light interference to a minimum.

A further aim of the invention is to reduce the interference of the flow fluctuation generated by the ordinary light sources present in the same environment where the emergency lighting apparatuses are installed.

A further aim of the invention is to make an apparatus and a relative method for the remote control of lighting apparatuses, which is reliable and safe and which can also be used by non-specialised users.

These and other aims, which can be more fully evaluated during a reading of the present description, are attained by an apparatus for the remote control of emergency lighting apparatuses according to appended claim 1, and by a method for using the apparatus according to claim 17.

Other detailed technical characteristics of the apparatus and the relative method of the invention are contained in the following dependent claims.

The apparatus advantageously allows using LED diodes (flashes) and/or displays, cameras and/or light sensors integrated in the smartphone for communicating (interrogating and programming) with emergency lighting apparatuses.

According to the present invention, the installer and/or maintenance operative can, thanks to a specific application program installed on the smartphone, dialogue with the lighting apparatus and the emergency lighting apparatus realised according to the present invention, so as to transmit and receive information.

In addition to controlling the diagnostic functions in systems made with apparatuses of the type described, the present invention allows programming and identifying a single apparatus within the system and/or set of systems considered by assigning an unequivocable address.

The application program acquires this address by allowing the installer to have a diagram (arrangement, type of product and programming) of the installed system, even if it is made using independent apparatuses.

The application program can associate, for each apparatus, strings of data containing a "description" field for recognising the position of the lamp within the system, a "photo" field, which also allows visually identifying the apparatus in the environment, and a "code and description of the lamp" field (which can be automatically compiled with the response of the lamp during programming).

Furthermore, with the apparatus powered up, it is possible to modify the operating procedures of the emergency lighting apparatus (i.e. non-permanent mode, permanent mode with low lighting, dimming, etc., where these definitions are defined in the applicable technical regulations) and the duration of the emergency (1 h, 2 h, 3 h, etc.) at all times.

The application program installed on the smartphone can allow, among other things, creating a register (logbook) of the system, in which not only is the status of the apparatus of the type described automatically registered, but also the characteristic events the system has undergone, in terms of the test dates, duration of the battery in the tests, battery charge status, code and description of the apparatus, program settings, type of error signalled by the multi-colour LED possibly present on the apparatus, and again more; in this case, the user can instantaneously know the meaning of the error signalled by the multi-colour LED and possibly obtain indications on possible solutions to be undertaken, directly from the smartphone.

The data resulting from registering the lamps can be automatically entered in or superposed on a plan of the rooms included in the installation, with the aim of univocally identifying the physical position of the apparatus in the system, so as not to allow a more rapid identification of the apparatus in the system by the maintenance operatives and the dedicated personnel.

For example, by sending a sequence of coded light commands (using a specific application installed on the smartphone and the flash or display integrated therein) to the apparatus during the installation step, the apparatus can be programmed to determine the type of operation (SE, SA, PS) and, in the specific case of emergency lighting apparatuses, to specify the duration of operation in the emergency mode (1 h, 2 h, 3 h, etc.).

During the step of periodic maintenance or if the signalling LED indicates a fault, the operative, can initiate test procedures of the apparatus of the type described and/or send a request to obtain identification data of the apparatus, cancellation of the errors, the saving (on the smartphone) of the data relating to the functioning status (for example the battery charge status) and the errors detected (LED errors, battery errors, etc.) again by sending coded commands via smartphone; the operative can also postpone carrying out the test, detect the type of apparatus and the code, if there is one, as well as the version of the apparatus software.

The data relating to each single apparatus can be sent from the application program to a "cloud" situated on a special server, so as to be able to develop a multiplicity of functionalities, from the user simply remotely saving the data on the system, to third parties opening a maintenance service. Considering that each apparatus has registered its logbook on the smartphone and the cloud, all the data is always available from any location and in real time.

Furthermore, the logbook saved on the cloud can be used by third-party operators to send a timely signal to the client when there is a need to perform operations on the system, and to provide useful information, such as the lamps (position, ID and type) which require maintenance, the type of maintenance required (replacement of the battery, of the apparatus, etc.), the exact codes of the replacements necessary, and any promotions there might be in order to encourage maintenance, etc.

The apparatus of the invention is substantially composed of two devices:
- a transmitter apparatus, consisting of a device provided with an element able to emit light signals having a desired duration and intensity (for example the flash and/or the display), further provided with sensors suitable for capturing digital optical signals (cameras and/or light sensors) and integrating a control and programming system as well as a memory for the allocation of specially-prepared software,
- an emergency lighting apparatus which incorporates a receiver device consisting of a light-sensitive element associated with a decoding and control circuit able to interface with the main circuit of the apparatus so as to actuate tests and/or carry out other functions (such as the attribution of configurations to the emergency lighting apparatus) and which may also integrate an LED module controlled in series by an appropriate Mosfet for generating the digital optical signal desired.

Among other things, the invention includes the use of a smartphone as a transmitter apparatus for sending the commands to the lighting apparatus via modulation of the switching-on of the flash and/or the display integrated therein; for this purpose a special algorithm is used for resetting the structure of the command system sequence naturally distorted by the latency to which the transmitter device (flash or display) is subject (latency is the delay time present during the switching-on/switching-off step of the flash and/or the display).

More specifically, smartphones are characterised by latency times that are highly variable and very strongly dependent on the original characteristics of the hardware and software, as well as the number of applications open in "background" mode which are a burden on the operating system.

The broad variability of latency times can compromise the efficiency of the transmission system, thus altering the signal sent with respect to the desired command and therefore, for this reason, the algorithm used and claimed allows introducing a variable in the construction of the command consisting of the estimation of the latency time starting from the moving average of the latency times measured form the first status change of the flash of the smartphone.

Furthermore, the reception of the light command is based on the use of photosensitive elements able to modulate the status and/or behaviour thereof with reference to the incident light on them.

The solution proposed by the present invention is aimed at constituting a special circuit section based on the use of said photosensitive components, specifically a photo-transistor, located in a circuit able to transform the signal, with amplitude proportional to the light, into a change of status (via a charging circuit of a capacitor and the comparison thereof with a reference value), the frequency of which is correlated to the incident light on the photosensitive device.

In this way, problems of saturation, to which the device can be subject in a traditional system, are eliminated, and the further disturbing elements are also resolved, such as the "flickering" phenomenon typical of the artificial illumination present in the places where emergency lighting systems are typically installed.

The optical manifold incorporated in the lighting apparatus described herein enables conveying, a part of the light coming from the flash and/or the display of the smartphone to the photosensor by amplifying it; the manifold further resolves any problem linked to the need to direct the signal unequivocally to a single apparatus in the presence of a plurality of apparatuses in the area.

BRIEF DESCRIPTION OF THE SEVERAL VIEWS OF THE DRAWINGS

Further characteristics and advantages of the present invention will more fully emerge from the description that follows, relating to a preferred embodiment of the apparatus for the remote control of lighting apparatuses and emergency lighting apparatuses the object of the present invention, provided by way of non-limiting illustration with the aid of the appended drawings, in which:

FIG. 4 is a graph showing the time base and a possible behaviour of the flash of a smartphone;

FIG. 5 is a list of the instructions given to the apparatus according to the control method the object of the present invention;

DESCRIPTION OF SPECIFIC EMBODIMENT OF THE INVENTION

Figure 1:
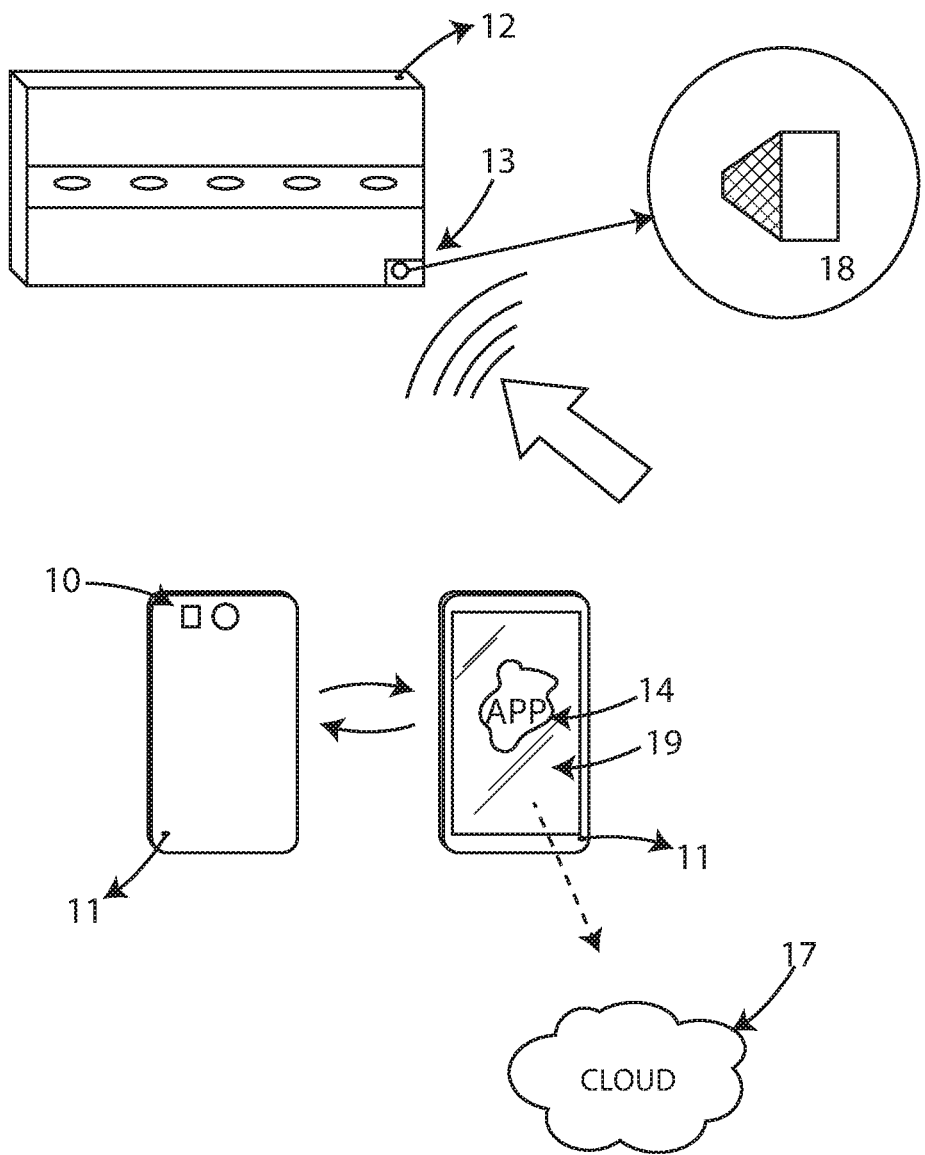
FIGS. 1 and 2 are respective schematic views of relative communication procedures of the apparatus for the remote control of emergency lighting apparatuses, according to the present invention.
Figure 2:
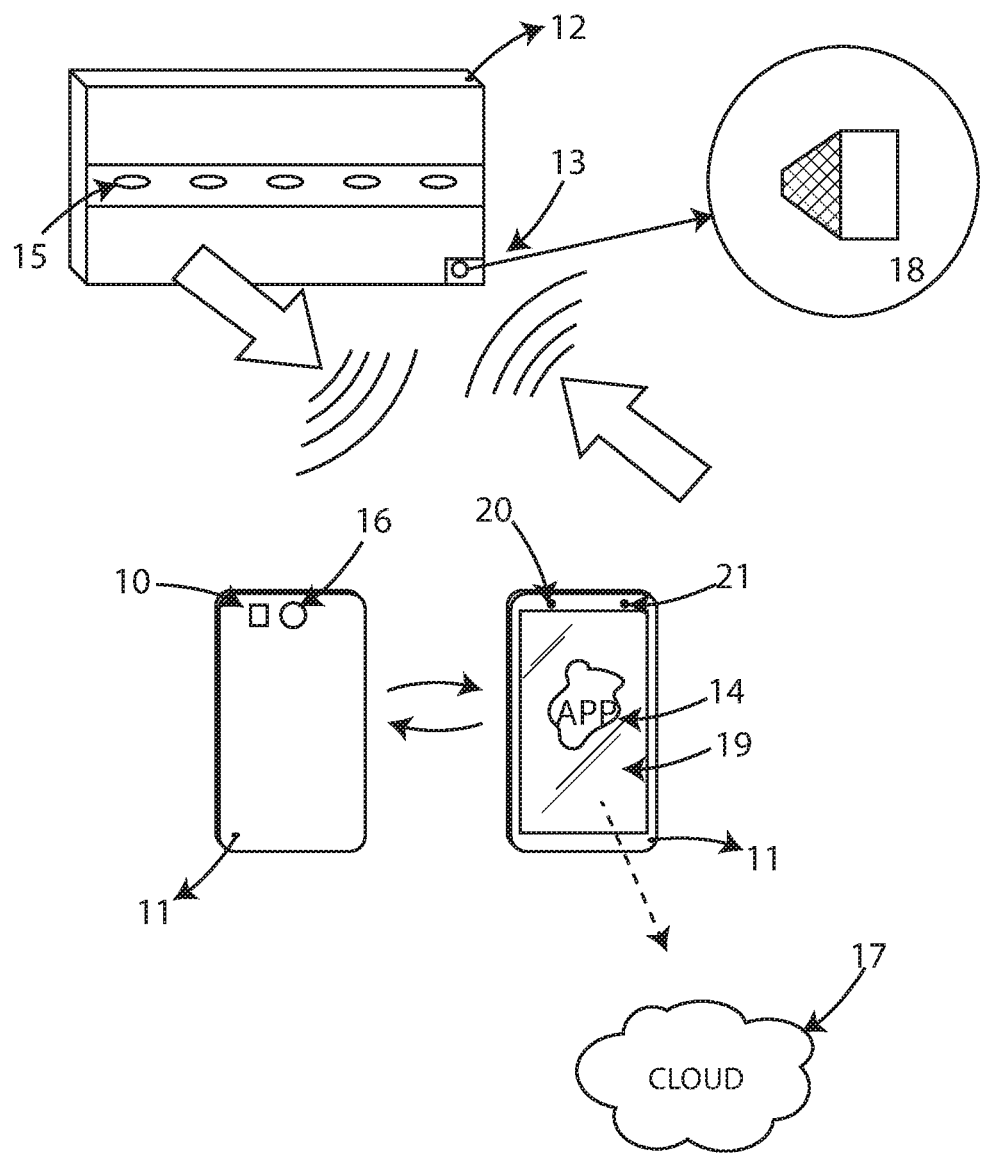

With particular reference to FIGS. 1 and 2, the apparatus for the remote control (with unidirectional and/or bidirectional communication) of lighting apparatuses, in particular emergency lighting apparatuses 12, of the type described herein, according to the present invention, is based on the use of the flash 10 and/or the display 19 of a smartphone 11 as a source of data transmission and of a specific circuit section inserted in the emergency lighting apparatus 12 of the type described herein, provided with a specific photosensor 13 as a receiver device.

In particular, the photosensor 13 is constituted by a photo-transistor and/or a photodiode, which are inserted in an electronic circuit capable of interpreting the modulated signal of the flash 10 and/or the display 19 by subtracting the offset due to the natural light and the artificial environmental light therefrom using solutions able to minimise the environmental flickering; on the other hand, the flash 10 and/or the display 19 of the smartphone device 11 have minimum characteristics and the above-mentioned smartphone 11, controlled by a specific software "app" 14, allows sending signals encoded according to the proprietor protocol of the emergency lighting apparatus 12 of the example described herein, so that the communication of the smartphone 11 to the lighting apparatus 12 is done with ON/OFF cycles of the flash 10 and/or the display 19 with a frequency of a few tens of Hz.

For the transmission step, an app (software application) 14 functioning inside the smartphone 11 is created, which is capable of sending optical commands created by modulating the switching-on and the switching-off of the flash 10 and/or of the display 19 of the smartphone 11.

This app 14 was developed specifically in the Android operating system but it may be developed on any platform (IOS, Windows, etc.) and aims to send encoded luminous messages via the flash 10 and/or display 19 and to receive further encoded luminous messages transmitted by the emergency lighting apparatus 12 of the type described, by means of a camera 16, 21 and/or light sensor 20.

The "app" 14 further decodes the data collected (in the form of images or videos) and converts them into comprehensible messages for the user, as well as manages the collected data, so as to plan the management of the whole lighting system by collecting information relating the performance of the apparatus 12 and automatically compiling the logbook of the above-mentioned lighting system (with the possibility of transferring and managing the data in remote "clouds" 17).

The lighting apparatus 12 described herein is provided with a dedicated LED module and/or an LED module that can provide safety lighting 15 which functions with a proprietary protocol for sending the data of the product and other functional data to a receiver device constituted by the camera 16, 21 and/or the light sensor 20 of the smartphone device 11; the smartphone 11, controlled by a specific software app 14, allows acquiring digital optical signals sent by the lighting apparatus 12, for example in the form of images of the product, from the moment in which transmission begins by the apparatus 12 (the images or videos collected contain the information sent by the apparatus 12).

The command transmitted by the flash 10 and/or the display 19 is represented by a sequence of ON/OFF switching or in general by light variations, which are appropriately controlled in terms of duration according to a determined code.

As regards to the intensity, in order to generate the frame of the message, it is generally possible to use various levels of luminosity, so as to increase the quantity of information transmitted in each time element of the frame.

A detailed description is provided below of the various possibilities of communication between the smartphone 11 and the lighting apparatus 12 and/or the emergency lighting apparatus of the type described.

The transfer of information in the form of modulated light between the emergency lighting apparatus 12 and the smartphone 11 takes place in two directions:
- from the smartphone 11 to the apparatus 12 in the form of an interrogation on the part of the smartphone 11;
- from the apparatus 12 to the smartphone 11 in the form of a response of the apparatus 12 to the interrogation.

As regards to the communication of the smartphone 11 to the lighting apparatus 12, according to the conditions of use, it is possible to use both the LED of the flash 10 and the display 19 of the smartphone 11 (or another similar device, such as a tablet) as the light-emitting device of the smartphone 11. The flash LED 10 has more directive characteristics and allows reaching lighting apparatuses 12 further away from the smartphone 11, while if the display 19 is used as the electro-optical device, it is possible if required to send the command to a plurality of lighting apparatuses 12 in the same environment, due to the "Lambertian" type of the optical emitting characteristics of the display 19.

The use of the display 19 instead of the flash 10 is useful especially for extending the scope of use of the invention also to devices not incorporating a flash, such as in the case of some tablets provided with large and very luminous displays.

As regards to the communication of the lighting apparatus 12 to the smartphone 11, the data can be sent from the lighting apparatus 12 to the smartphone 11 and/or tablet, in response to the interrogation, using various alternative methods.

Primarily, it is possible to use the camera of the smartphone 11 and carry out the analysis of the single frames acquired with a single photo-snap.

In particular, the acquisition command is given to the cameras 16, 21 integrated in the smartphone 11, and the image processor activates the address decoding of the pixels constituting the matrix so as to acquire the luminous signal corresponding to the single pixels, one by one, thus connecting the single digital-analogue converter of the camera 16, 21 in succession to the various pixels which make up the image.

Figure 19:
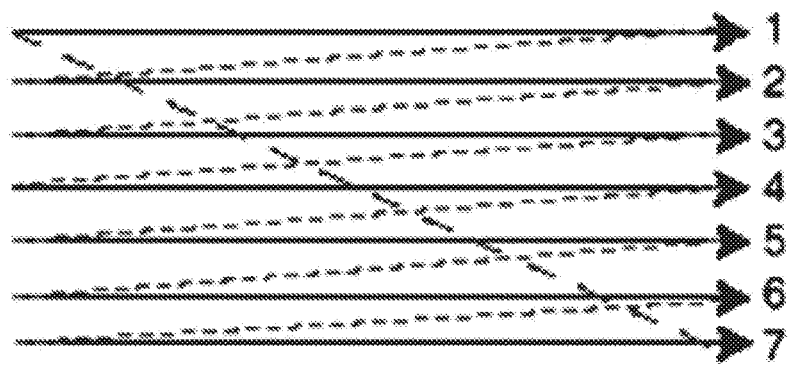
FIG. 19 illustrates the acquiring mechanism typically used by the cameras the smartphone is provided with to scan the images.

The scan is done from left to right starting from the first line at the top and finishing with the final line at the bottom of the image (as shown in FIG. 19).

By way of example, a 5 megapixel image sensor, for example 2592×1944 pixel, which can be read at 27 MHz pixel clock, requires a time of about 96 μs to completely scan a line of 2592 pixels; to scan the whole image of 1944 lines, 1944*96 μs=186.6 ms are required.

In order to send the data to the smartphone 11, the emergency lighting apparatus 12 of the example described uses the OOK (On Off Keying) method to modulate the light emitted by its LEDs; the operation can be performed with an appropriate Mosfet connected in series with the LED module 15.

Figure 17:
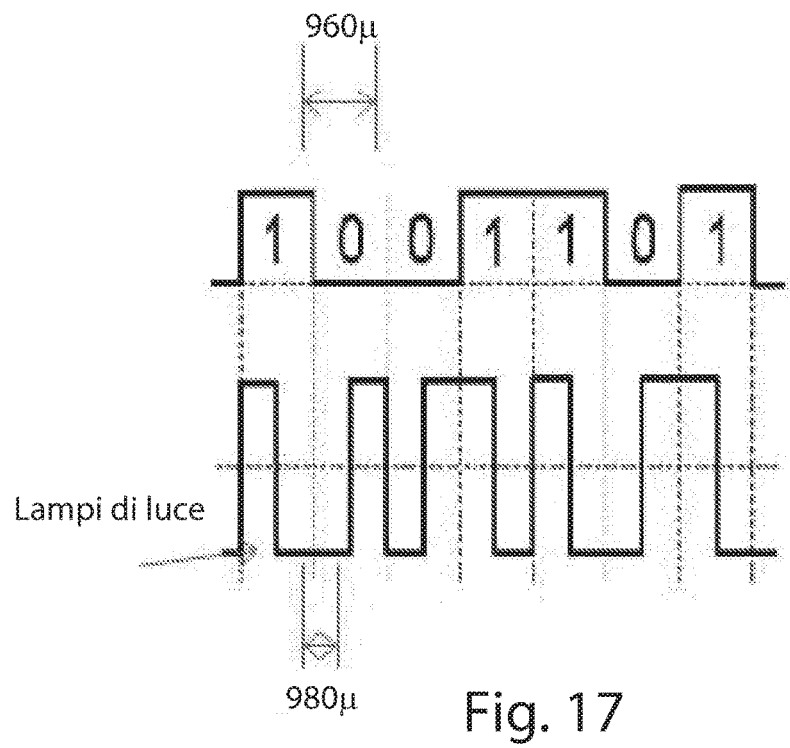
FIG. 17 schematically illustrates the principle of transduction of a digital signal into an optical digital signal by the transmitter device, possibly integrated in the lighting apparatus according to the present invention.

The optical signal produced by the LED module 15 thus controlled could be modulated, only by way of example, with a bit clock for example at 2.08 KHz, with a minimum time of the light period of 480 μs; using for example a Manchester type code, this corresponds to a bit time of 960 μs (as shown in appended FIG. 17).

Figure 18:
FIG. 18 is a view by way of example of the transposing of the optical digital signal of FIG. 17, as interpreted by the receiver device via its sensors, according to the present invention.

In this way the image "captured" by the camera 16, 21 in a single frame would be an alternation of more luminous groups of lines and darker groups of lines correlated to the sequences of the "flashes" emitted by the product (as shown in FIG. 18).

The software developed on the smartphone 11 is therefore able to decode the signal shown in FIG. 17, which transports the exemplified information content 1, 0, 0, 1, 1, 0, 1 (FIG. 18).

In a second case, the camera 16, 21 is used in "film" mode, and a film is recorded at a certain determined speed of acquisition; in this transmission mode the emergency lighting apparatus 12 can transmit sequences of bits that are much slower, in which each flash of light emitted must last for a greater time than a few frames of acquisition of the camera 16, 21.

By way of example, if a bit has a duration of at least 5 frames, it will be possible to transmit at a speed of about 6 bits/second (with acquisition imported for example at 30 frames per second) and therefore it will be possible to transfer about 60 bits in about ten seconds.

The light sensor 20 integrated on the display side of almost all smartphones 11 can also be used to receive the optical signal.

This sensor 20 is normally used in smartphones 11 as a proximity sensor and therefore has a very rapid response. The input signal from the light sensor 20 can be processed by an appropriate algorithm able to correlate the variations in intensity caused by the optical signal at the average value preceding the transmission, and thus able to reconstruct the digital transmission sequence.

The reception on the part of the emergency lighting apparatus 12, as mentioned, is entrusted to an electronic detection circuit based on the photosensor 13, which is integrated in the lighting apparatus 12 and is able to interpret the light command received from the flash 10 and/or from the display 19.

The task of the receiver (photosensor 13) is to capture the light variations of which the frame is constituted and to convert them into digital sequences that correspond to actions for the illuminating body, such as switching-on, switching-off, start-up of the self-diagnosis procedure, etc.

A suitable optical appendage (optical manifold) 18 able to convey and amplify the light beam towards the receiver photosensor 13 is present in order to improve the function in the emergency lighting apparatus 12.

One of the characteristics of the apparatus of the invention is in fact the directional aspect; in fact, the optical command, in particular the command generated by the flash 10 of the smartphone 11, must be directed with precision towards the receiving optical element 18 associated with the photosensor 13 of the lighting apparatus 12.

A choice, though not exclusive, of the project is in fact that of making a connection of the point-to-point type, also to allow for a virtual sub-division of the lighting system (zoning of the apparatus) with the aim of increasing the operating safety of the system itself.

In other words, the user might be able to carry out actions using the smartphone 11, only on one lighting apparatus 12 at a time, including in the case where there are a plurality of apparatuses 12 spatially at the limits of the circuit.

The directionality is obtained by means of the optical manifold 18 inserted in the apparatus 12, which is able to capture the light messages of the flash 10 and/or the display 19 sent only within a solid angle α, the vertex of which is represented by point A in which the receiver photosensor 13 present on the lighting apparatus 12 is located.

In relation to the communication modes, among the elements constituting the object of the invention, there are two relevant portions that identify and characterise the apparatus and the method according to the present invention, and they are:
the modulation algorithm of the flash 10 and/or of the display 19 of the smartphone 11 with a correction of the latency time and
the hardware/software design of the receiving electronic circuit associated with the photosensor 13 and integrated in the lighting apparatus 12.

The limitations in the use of the flash 10 and/or the display 19 of the smartphone 11 as an optical system for data transmission relate to the hardware and software of the mobile device (the smartphone 11 itself).

In fact, each smartphone 11 is characterised by its own univocal hardware platform and by a management operating system of a "high" level that can be considered as an intermediate software layer between the applications accessible to the user and the low-level firmware for the management of the hardware sections of the smartphone 11 (camera, flash, GPS module, Wi-Fi module, touchscreen, etc.).

It should therefore be considered that the app 14 will by necessity have to exploit the software possibilities made available by the underlying operating system but will not be allowed to intervene with direct commands on the hardware sections of the device.

A first significant constraint to be considered in creating the app 14 is thus linked to the transmission velocity of the light command, as each smartphone 11 has its own times for enabling and switching-off the flash 10 and/or the display 19, which are intrinsic to the device and cannot be manipulated.

In a preferred but non-limiting embodiment of the apparatus according to the invention, a smartphone 11 can be used having an Android 5.0 system and a binary optical code is defined for the transmission of the data via the flash 10 and/or display 19, which code, by way of non-limiting example, has the following features:
bit=0 identifies a transition from flash=OFF status to flash=ON status;
bit=1 identifies a transition from flash=ON status to flash=OFF status.

The definition of this code is arbitrary and any other association between the logic status of the bit and the condition of the flash 10 and/or the display 19 can be applied with similar considerations.

A command such as a sequence of a determined number of bytes is also defined. From the point of view of the user, the app 14 includes the presence of "buttons" or "icons" associated with defined commands.

By activating the appropriate function from the app 14 menu, the device will activate the conversion of the command (bit sequence) into flash modulation 10 of the smartphone 11 according to, for example, the above-reported code.

The conversion of a binary command into switching-on and switching-off of the flash 10 occurs in a separate thread from the main management thread of the GUI of the app 14, and a string is passed to the autonomous thread, which string is composed of characters identifiable as bits (i.e. values or 0 or 1).

Furthermore, the string is analysed character by character and, on the basis of the 0 or 1 value, the transition of the flash 10 to be carried out is decided on.

As previously indicated, as there is no real-time system, there is a non-negligible latency (delay) between the system receiving and the effective switching-on or switching-off of the flash 10 and/or the display 19; this delay, which is in the order of several milliseconds, is not quantifiable beforehand and varies dependently on the hardware of the device, on the basis of the version of the operating system, the number of the applications running, etc.

This latency cannot be ignored, unless the decision is made to switch the flash 10 on and off with particularly long times (in the order of several hundredths of ms, for both on and off switching); in this way, however, the whole application would lose meaning, as the run time of the whole light command would be tens of seconds, which is an unacceptable condition for the practical use of the system that is to be made.

Therefore, according to the invention, a special transmission algorithm is used to correct the latency times in the use of the flash 10 and/or the display 16 of the smartphone 11.

By way of non-exhaustive explanation, let's say each bit has a time of 80 ms characterised by a flash-on time of 40 sec and an identical flash-off time; by considering 32 bits for the command, the overall time is about 2.5 seconds.

The 40 ms duration of the switching-on (T-on) and the switching-off (T-off) of the flash 10 is a relatively contained time span, if we consider that the system used is not a real-time system. However, using these time-frames, the delay between the execution of the software instruction and the real switching-on (or switching-off) of the flash 10 and/or the display 19 is not insignificant.

It is therefore necessary to introduce an algorithm to reduce the effect of this delay to a minimum.

For this purpose, first a precise time base is sought as a reference standard.

Thus a first variable is generated, which we identify here as "timestart", which saves the start instant of the first start instruction of the light frame, and a second variable is generated, which we identify here as "wakeup=timestart+period", which indicates the first tick of the clock, i.e. which precisely identifies the moment at which 40 ms has passed since the start.

By increasing the wakeup variable by 40 ms at each sending of a switching-on or switching-off instruction of the flash 10 and/or of the display 19, a precise time base defined by the initial timestart can be obtained.

In practice, after the setting of the status of the flash 10 and/or the display 19, it is sufficient to wait till the actual instant becomes identical to the instant established with the wakeup=timestart+period time base.

Figure 3:
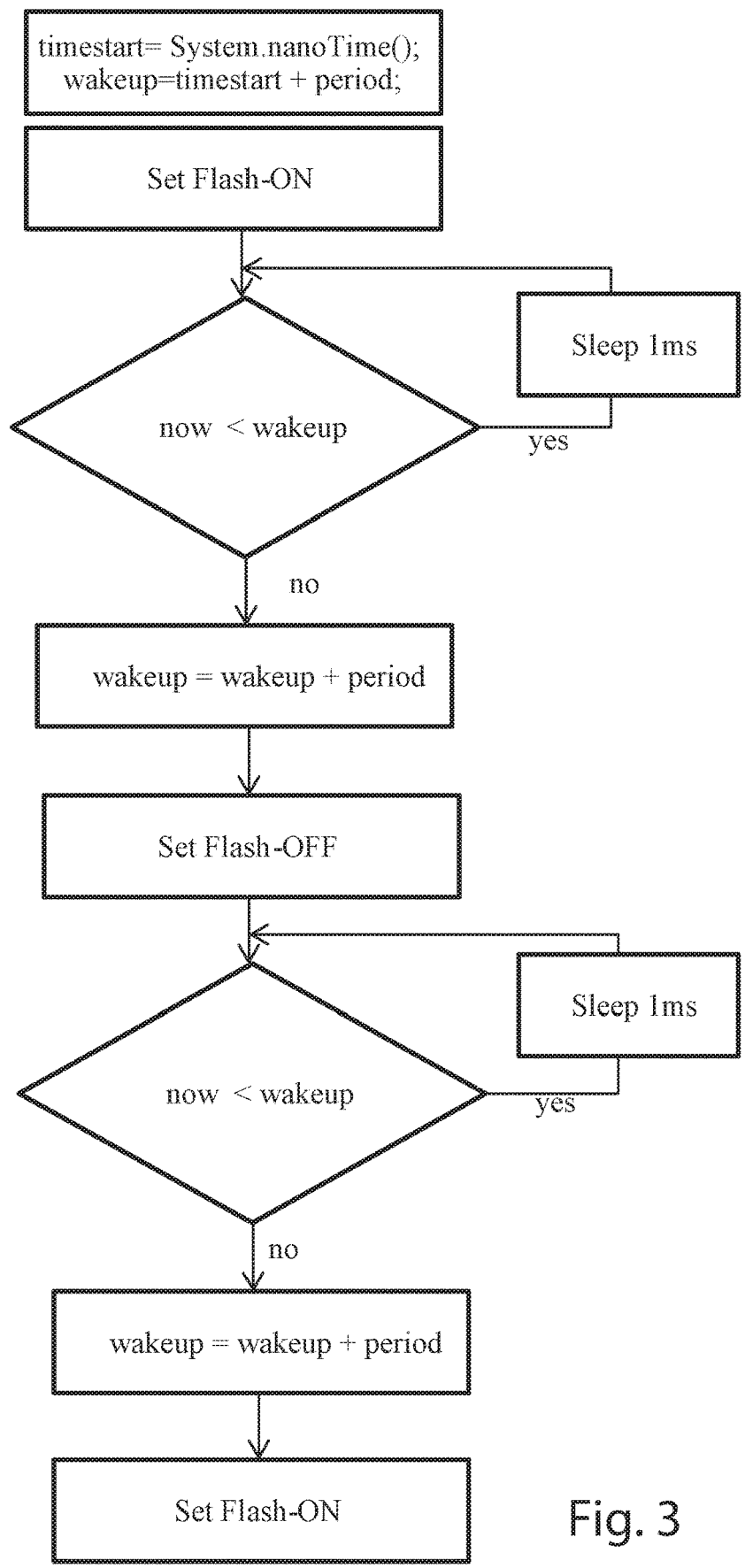
FIG. 3 is a flow chart relating to the carrying out of a switching-on and subsequently a switching-off of the flash of a smartphone, used in the control apparatus according to the present invention.

The flow chart illustrated in accompanying FIG. 3 illustrates what occurs during the carrying out of a switching-on and subsequently a switching-off cycle of the flash 10 and/or of the display 19.

By doing this, a precise period (80 msec) of "T-on+T-off" is obtained, but it is not certain what delay took place during the switching-on or switching-off of the flash 10 and/or the display 19.

What happens, therefore, is that although the T-on+T-off time is precise and established, the T-on percentages of the flash 10 and/or the display 19 and the T-off of the flash 10 and/or the display 19 are not 50%, due to the intrinsic latency.

To better understand the problem of this delay or latency, the graph of FIG. 4 can be analysed, which shows the time base and a possible behaviour of the flash 10 and/or the display 19 of the smartphone 11.

As can be seen from the graph, there is a delay between the "flash on" command and the real switching-on, and the same consideration is valid for the flash-off command; in these conditions, the presence of unmanaged latencies causes the impossibility of receiving a correct command from the lighting apparatus 12 and therefore a corrective intervention is required.

In order to reduce to a minimum the above-mentioned latencies, according to the present invention, the following preliminary hypotheses are formulated:

on the specific smartphone 11 provided with a specific operating system and software context, the delays in the flash 10 switching-on step are indicatively of the same entity and a similar reasoning is valid also for the delays during the flash 10 switching-off step;

the instructions are carried out in sequence within the thread for generating the optical command;

each instruction carried out within the thread has an insignificant duration with respect to the switching-on and switching-off software directives or commands of the flash 10 (which are responsible for delays).

These considerations allow the affirmation that, once the switching-on and switching-off delay times are estimated, it is possible to correct the tick for this value which will carry out the switching-on and switching-off flash 10 commands, so as to have a more precise optical communication time.

The indicative detection of the delay time can be carried out by calculating the difference between the time detected from the carrying out of the command and the preceding command to the carrying out of the command itself.

To do this, the time passage is detected, both at the moment of carrying out the instruction preceding the switching-on or switching-off command or directive of the flash 10 and/or the display 19, and at the moment of carrying out the instruction subsequent to the directive.

The block diagram shown in FIG. 5 shows the list of the instructions given.

Therefore, for each switching-on or switching-off of the flash 10 and/or the display 19, two variables are obtained, termed "delay_on" and "delay_off".

At each new switching-on or switching-off of the flash 10 and/or the display 19, therefore, a respective new delay_on and delay_off variable will be generated, that can be mediated by means of a calculation routine, with the previously acquired data.

That is, two values are defined, in continuous evolution, termed "delay_average_on" and "delay_average_off", deriving from the averages of the delay values detected at each switching-on and switching-off cycle of the flash 10 and/or the display 19, which occurred during the sending of each light command.

An external text file is therefore made available, which is necessary for conserving the data useful for generating the absolute average values delay_average_on and delay_average_off.

The "delay_average_on" and "delay_average_off" values are then used at each switching-on and switching-off cycle of the flash 10 and/or the display 19 in the following way:

if "delay_average_on">"delay_average_off", an absolute value "delay_abs" is calculated, given by the "delay_average_on"–"delay_average_off" difference;

if "delay_average_on"<"delay_average_off", an absolute value "delay_abs" is calculated, given by the "delay_average_off"–"delay_average_on" difference.

Figure 6:
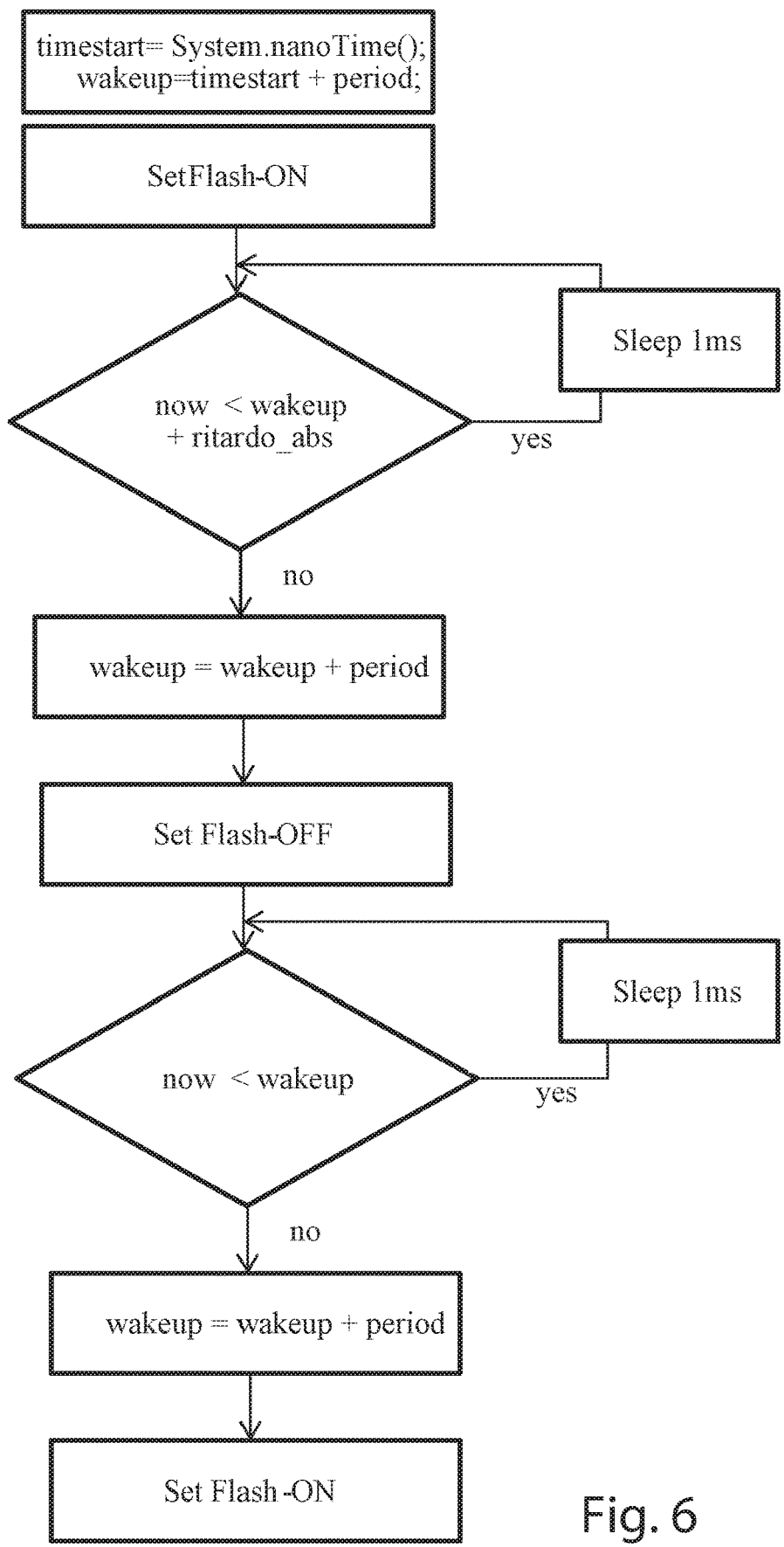
FIG. 6 is the flow chart of FIG. 3, in which a delay variable is used for the purpose of reducing the latency effect on the switching-on and switching-off of the flash.

FIG. 6 shows how the flow chart of FIG. 3 changes by using the "delay_abs" variable, with the aim of reducing to a minimum the effect of the switching-on or switching-off delays of the switching-on or switching-off of the flash 10 and/or the display 19 (in the case illustrated, delay_average_on>delay_average_off is hypothesised).

From the chart it can be seen that the delay_abs value is added to the wakeup variable with the aim of carrying out the "SetFlash-OFF" directive or command with the delay calculated.

In the opposite case, i.e. with delay_average_on<delay_average_off, it would have been necessary to increase the wakeup variable of the delay_abs in the subsequent control, with the aim of carrying out the "SetFlash-ON" directive with the delay calculated.

Figure 7:
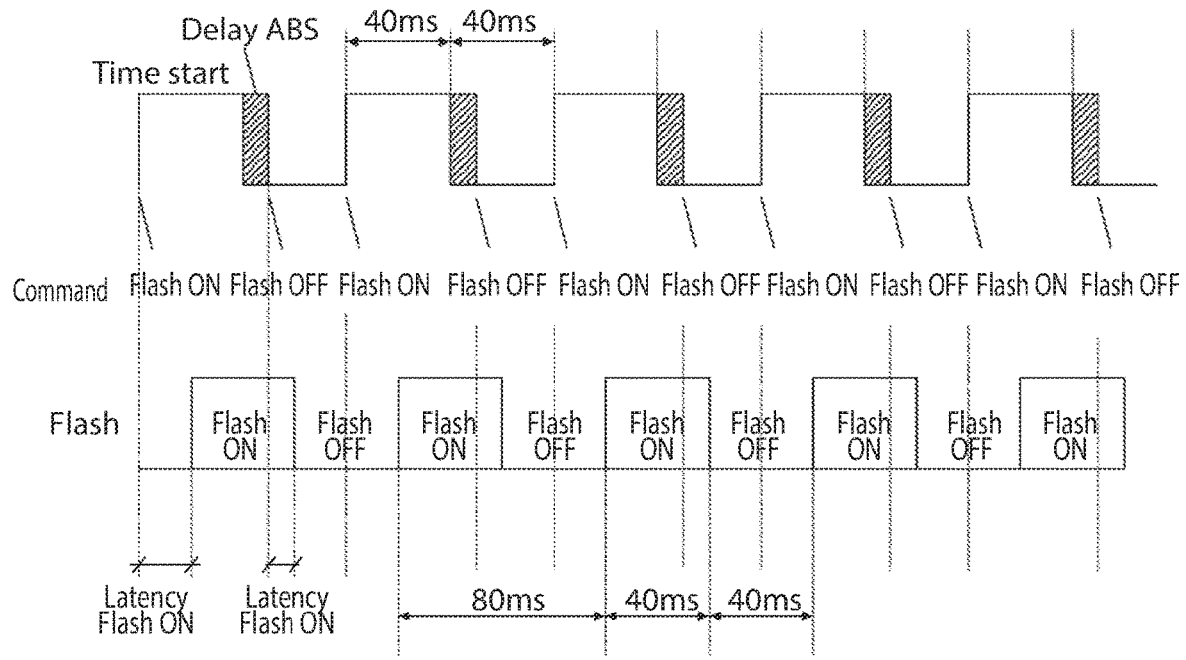
FIG. 7 illustrates the graph of FIG. 4, varied following the introduction of a delay management algorithm, according to the present invention.

FIG. 7 shows the change of the chart of the times of FIG. 4 following the introduction of the delay management algorithm.

In the specific circuit section intended to constitute the receiver device 13, it is necessary to use a device able to convert, according to a certain proportionality, the intensity of the incident light coming from the flash 10 and/or the display 19 of the smartphone 11 into an electrical magnitude, such as a voltage or a current.

The photosensitive receiver element 13 to be used can be a photodiode or a photo-transistor.

Figure 8:
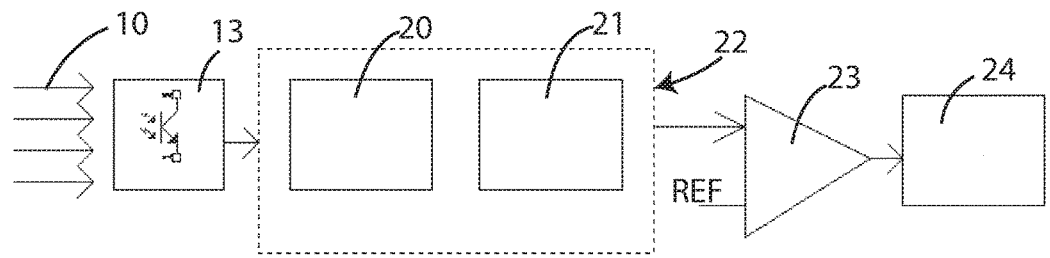
FIGS. 8 and 9 show two schematic embodiments of the receiver which can be used in the control apparatus of the invention.

In the case of the photo-transistor, the preferred element according to the present invention, the output current is proportional to the incident light, and therefore, in order to attain the desired aim, a possible hardware solution is schematically represented in the block diagram of FIG. 8.

The input blocks to the amplifier 20 and the filter 21, which constitute a sort of active filter 22, perform the function of increasing the level of the electrical signal output from the photosensitive receiver element 13 and of selecting therefrom only the frequency band that is useful for the transmission.

However, it must be taken into consideration that the light L incident on the receiver photosensor 13 is not only the light emitted by the flash 10/or the display 19 of the smartphone 11, but also the environmental light, which can be a natural light or an artificial light.

This constitutes an interference signal for the communication, essentially for 2 reasons:

1) the environmental light L incident on the receiver photosensor 13 can have an absolute intensity that is much higher than the intensity of the incident light that can be attributed to the light emitted by the flash 10 and/or the display 19 of the smartphone 11;

2) the fluctuation (flickering) present in the light emitted by the artificial light sources (fluorescent or LED) which although it is imperceptible to the human eye, it is in fact intercepted by the photosensitive elements and it occupies a frequency band that is practically the same as the useful signal (this spectral superposing is due to the constraints in the communication times, relative to the telephone performance, and to the link present between the flickering of the artificial light and the frequency of the electricity supply network).

To obviate these drawbacks and obtain a good functional level of the system, it may help to introduce an adaptive amplification level for the amplifier 20 and a variable REF threshold linked to the environment light; however, this amplification can give rise to saturation phenomena, thus making communication effectively impossible.

As regards the drawbacks relative to the timings, a solution might be to increase the transmission time relative to the single bit so as to facilitate the realisation of the inlet filter.

A further specification for combatting the drawbacks mentioned in the foregoing can be to reconstruct, using a microcontroller 25 (comprising an A/D converter 26, a digital memory 27, a delay block 28, a D/A converter 29, a comparator 23 and a decoder 30), the waveform linked to the environmental light at the moment when it is known that no transmission is underway, and using the signal created as a reference REF for the comparison at the moment of transmission.

At the base of this approach is the hypothesis that the interfering environmental luminosity is subject to variations over a long time with respect to the transmission time.

Figure 9:
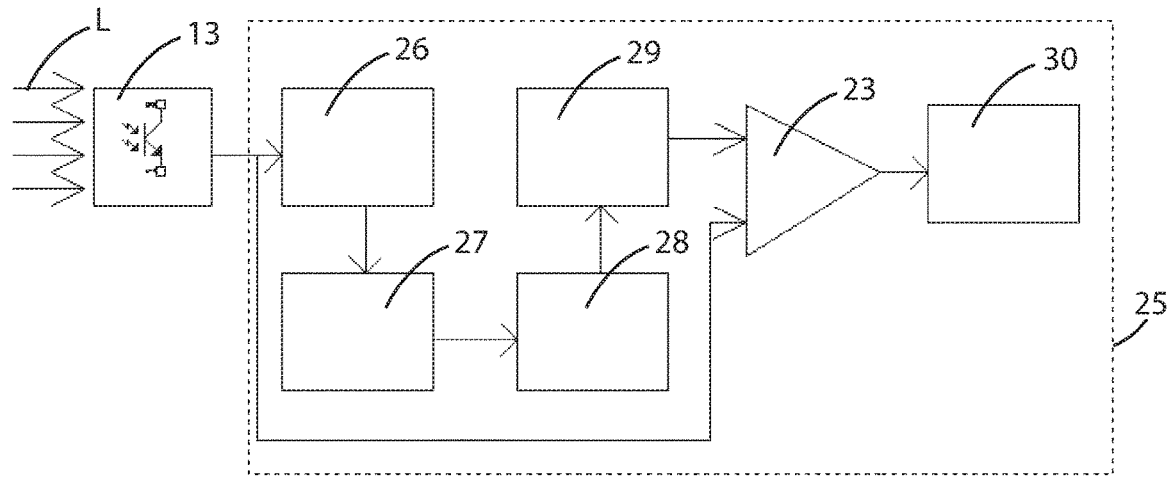

A block diagram of this possible method is represented in FIG. 9.

In this way, if the hypotheses are respected, at the output of the comparator 23 there is a signal linked to the differential light alone, which can be traced to the transmission of the flash 10 and/or the display 19. The described technology is certainly feasible, but laborious in the design of the microcontroller 25, which requires a significant level of performance both as regards to the hardware resources and in relation to the velocity of execution, as it is necessary to reconstruct an analogue signal with a specific level and a specific harmonic content.

It is also possible to introduce a filtering for attenuating the frequency components originating from the power supply grid (50 and 100 Hz) so as to increase the ratio between a useful signal and an interfering signal, but this procedure does not resolve the problem linked to saturation in the case of strong environmental light.

In preferred embodiments of the invention, the hardware solution provided is based on a different approach with respect to those mentioned in the foregoing and enables obviating the described limitations.

Figure 10:
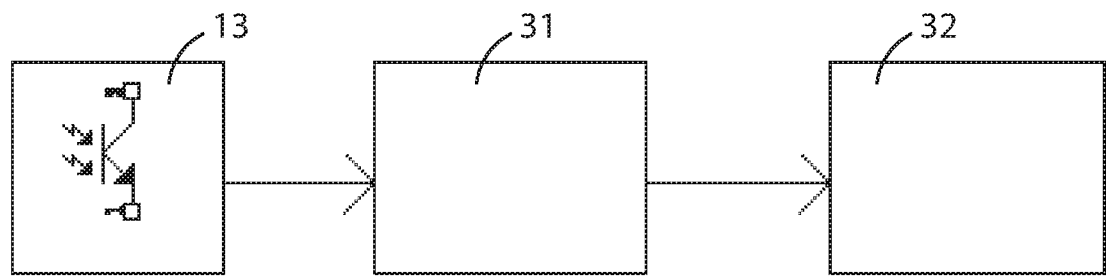
FIG. 10 shows a further schematic embodiment of the receiver which can be used in the control apparatus of the present invention.

In practice, again considering a photo-transistor as a photosensitive receiver element 13, the solution is based on the use of a multi-vibrator 31, connected to a microprocessor 32 (see the block diagram illustrated in FIG. 10), the switching frequency of which multi-vibrator is determined by the incident light.

Again in the hypothesis that the environmental light or luminosity varies slowly with respect to the transmission time of a frame, it is simple for the microprocessor 32 to save the number of switchings of the multi-vibrator 31 in a specific time interval in conditions of absence of communication, as the number depends exclusively on the environmental luminosity.

Figure 11:
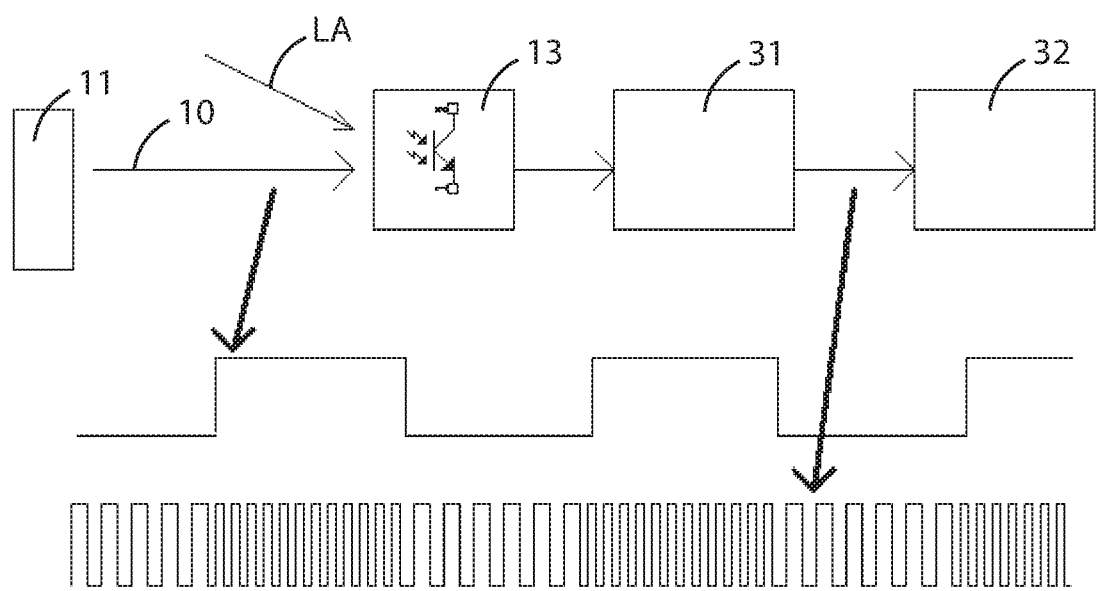
FIG. 11 is a schematic diagram of the luminous variation of the flash over time with reference to the hardware solution of FIG. 10, according to the present invention.

At the instant of superposing the light from the flash 10 and/or display 19 of the smartphone 11, the number of switchings in the same time interval is subject to an alteration with respect to the initial value (as shown in detail in the block diagram, complete with a relative profile of the light of the flash 10 and the signal output from the multi-vibrator 31 of FIG. 11).

By adopting appropriate circuit specifications, it is possible to make the information obtained from the environmental luminosity independent, thus avoiding saturation phenomena.

Figure 12:
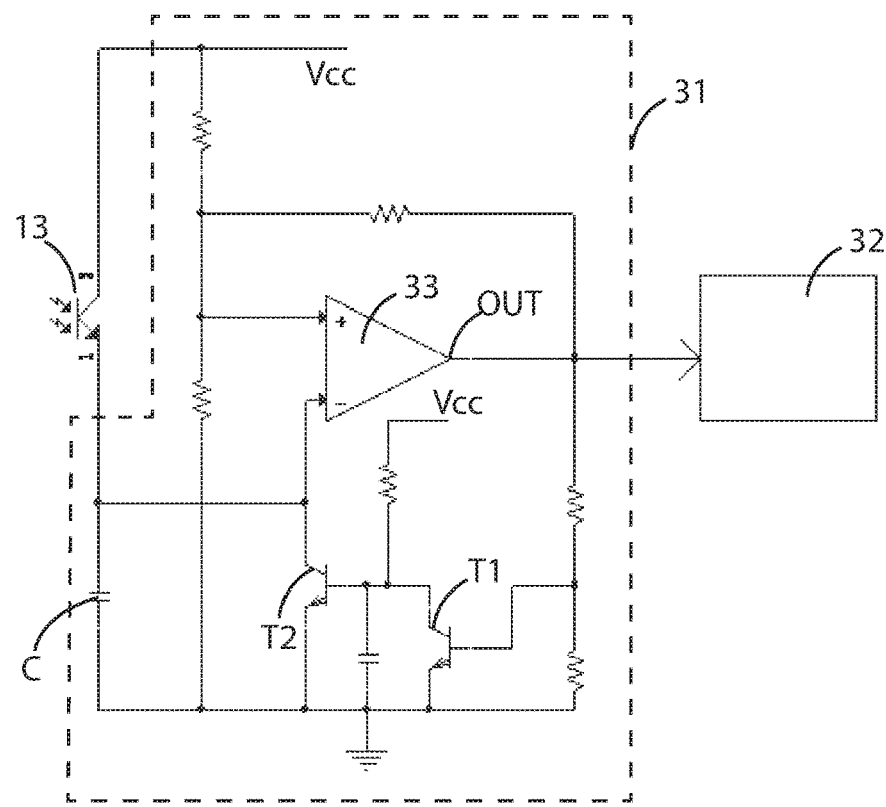
FIGS. 12, 13 and 14 are circuit details of the hardware solution of FIG. 10, according to the present invention.

In particular, the current output from the receiver photosensor 13 (constituted by a photo-transistor in the preferred embodiment) has the task of charging the capacitor C of the multi-vibrator 31, thus causing an increase of the voltage thereof (this circuit solution is illustrated in detail in FIG. 12).

Starting from a condition where the capacitor C is not charged, the comparator 33 has a high output voltage; in these conditions the transistor T1 is switched on while the transistor T2 is off.

Once the capacitor C voltage has reached the level of the non-inverting pin voltage of the comparator 33, the output voltage of the comparator 33 changes status, thus equally inverting the switched-on status of the transistor T1 and T2.

In these conditions, the non-inverting pin voltage of the comparator 33 drops instantaneously, while the transistor T2 discharges the capacitor C up to the moment when the voltage thereof is equal to the voltage of the inverting pin of the comparator 33; in these conditions the photo-snap direction is reversed and the cycle is repeated.

The greater the incident light of the flash 10 and/or the display 19, the less time that will be necessary to arrive at the voltage level necessary for carrying out the first status change described in the foregoing.

With this solution, the effect given by a strong environmental luminosity is only that of causing the multi-vibrator 31 to oscillate at a high switching frequency: at the moment of receiving the message, this will induce the same increase of frequency, whatever the level of environmental luminosity.

At the same time the effect of the interfering light given by the artificial light sources has the effect of altering the frequency due to the average level of luminosity, but the incident light of the flash 10 and/or the display 19 originating from the message in transmission will in any case lead to a positive variation with respect to the starting frequency.

Figure 13:
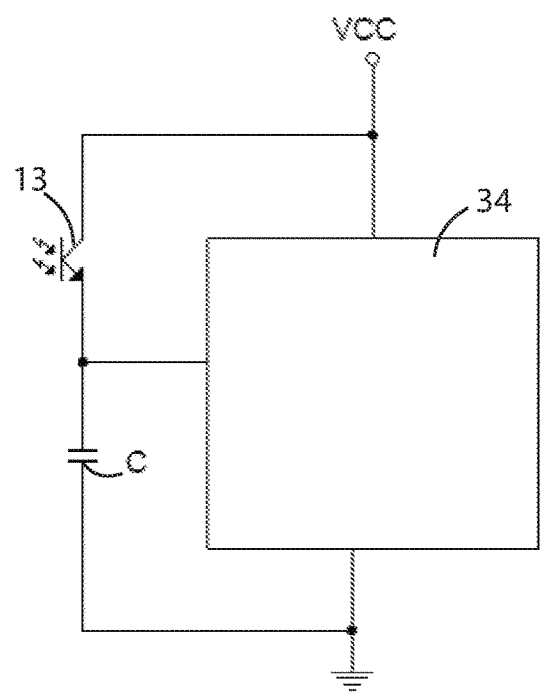

This solution can be obtained directly by using the internal resources of a microprocessor 34, as indicated in FIG. 13, which relates to an alternative circuit solution.

By appropriately dimensioning the circuit it is thus possible to avoid saturation phenomena.

It can therefore be concluded that the circuit solutions illustrated in FIGS. 12 and 13 allow realising the digital analogue conversion circuit; with a suitable dimensioning of the capacitor C and the other circuit elements, it is possible to obtain output frequencies of the converter able to prevent saturation phenomena of the output variable of the converter (the multi-vibrator oscillation frequency). In this way it is possible to effectively apply, to the output of the circuit 12, 13, a virtual processing "machine" able to implement suitable digital filters able to attenuate the effect of the flow fluctuations at grid frequency (flickering), which is a typical effect of a majority of the artificial lamps normally used in making lighting systems.

The above-mentioned virtual machine can be for example implemented inside the microcontroller 32, 34.

Figure 14:
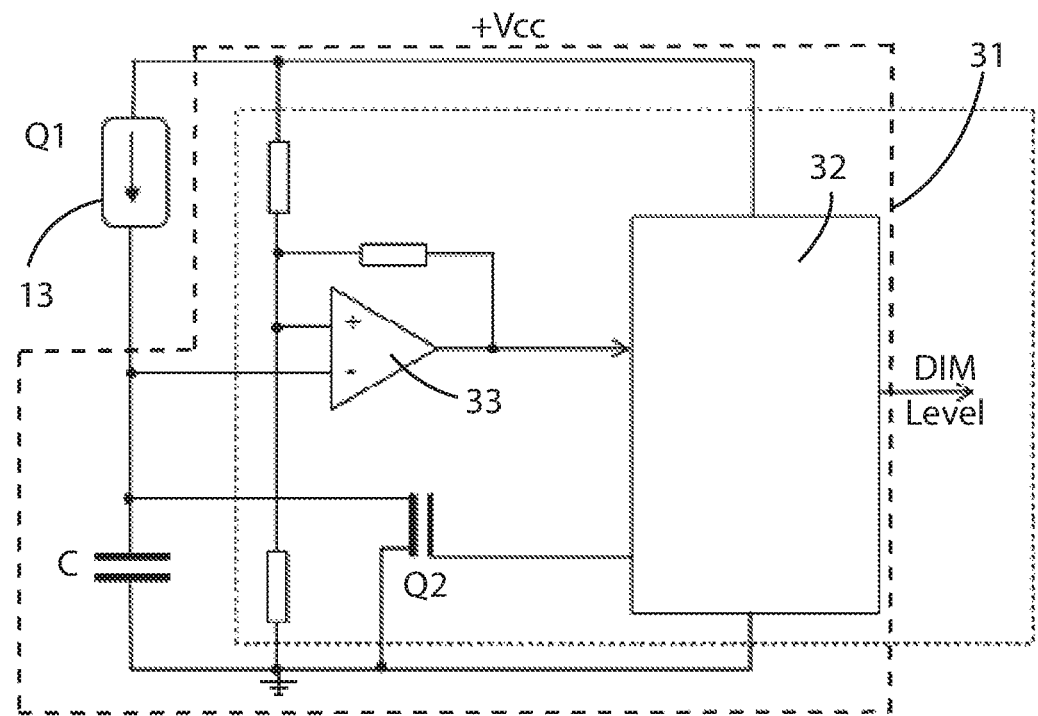

In particular, the microcontroller 32, 34 in the version of FIG. 14 implements the following filtering function.

The microcontroller 32, 34 in the version of accompanying FIGS. 12 and 14 is able to command a "resetting" time instant of the capacitor C and, in particular, the unblocking instant (the switching-off of Q2) and therefore the starting of the time measurement of the charging time of the capacitor.

Illuminating lamps generate a light ripple at the grid frequency (for example 50 Hz in Europe) and the microcontroller 32, 34 in the art described herein synchronises the start instant of the capacitor C charging at the grid frequency, with everything being dimensioned to complete the capacitor C charging by the end of the synchronism period (for example within 10 mS if the grid has a 50 Hz frequency); in fact, the microcontroller 32, 34, integrated in the emergency lighting apparatus 12 is connected to the power grid Vcc from which it extracts the synchronism elements. The microcontroller thus synchronises the start instant of the charging of the capacitor C, for example at "zero" of the grid frequency.

The cancellation of the flicker in this way becomes complete and automatic without any need to further process the output signal of the converter 33 of FIG. 14.

In fact, having synchronised the converter 33 of FIG. 14 with the cause of the possible flicker, the intensity of the light emitted by the lighting apparatus, if present, repeats in the same way at each conversion of the circuit of FIG. 14 and introduces an offset that is constant or variable over time with respect to the modulated signal emitted by the flash 10 and/or the display 19 of the smartphone 11.

It is clear that by being constant or slowly variable with respect to the useful signal, this offset is automatically cancelled by the ASK receiver implemented in the microcontroller 32, 34. Therefore the advantage of the architecture in FIG. 14 is clear, and simply and economically resolves the dual problem of the possible saturation and the presence of flickering at the grid frequency.

It is also possible to include further technical specifications able to improve the reception of the light commands by means of the flash 10 (and/or another part of the device suitable for the function) of the smartphone 11, so as to obtain a greater facility of use, as well as a broader spectrum of use.

To do this, according to the present invention, it is possible to increase the sensitivity of the receiving section and seek to reduce to a minimum the environmental light interference by introducing an adaptive autoscaling, with the aim of obtaining maximum sensitivity on light commands with respect to the environment light present, and a synchronising system to the supply frequency, with the aim of reducing the interference of the flickering generated by the ordinary light sources present in the same environment.

Figure 14A:
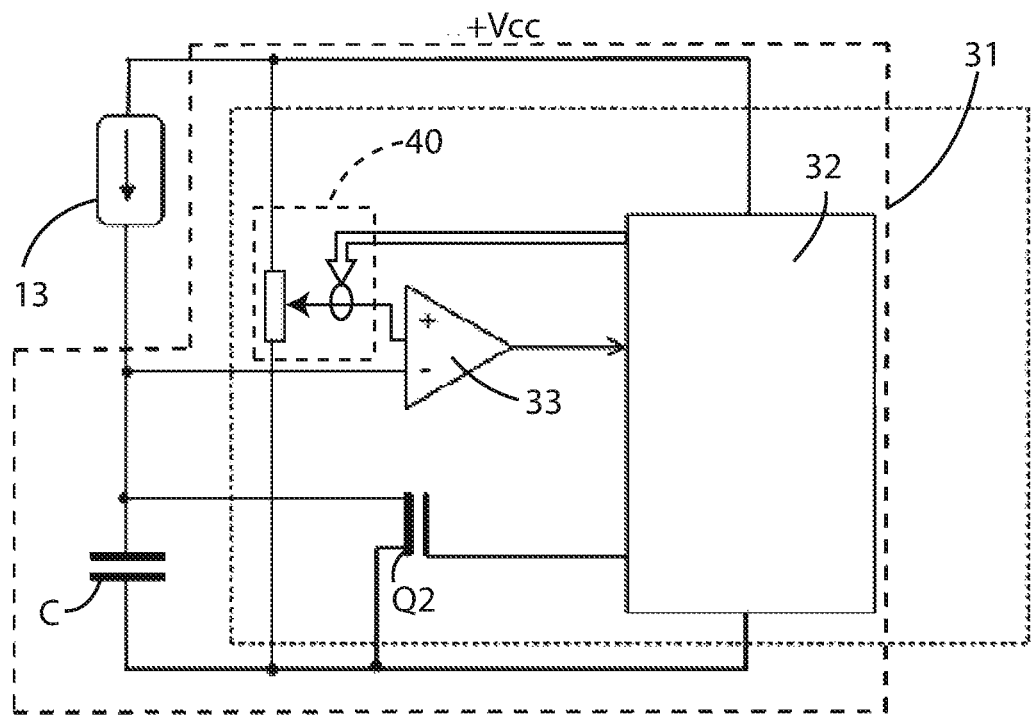
FIG. 14A is a circuit variant of FIG. 14, according to the present invention.
Figure 15A:
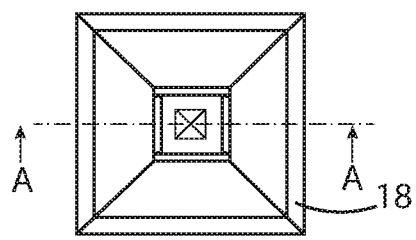
FIGS. 15A and 15B illustrate two perpendicular schematic views of the optical manifold indicated in its entirety by reference numeral 18 in FIGS. 1 and 2.
Figure 15B:
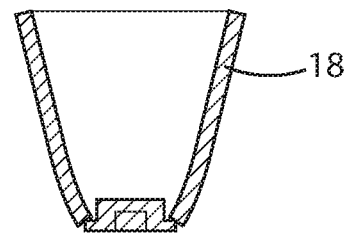
Figure 16:
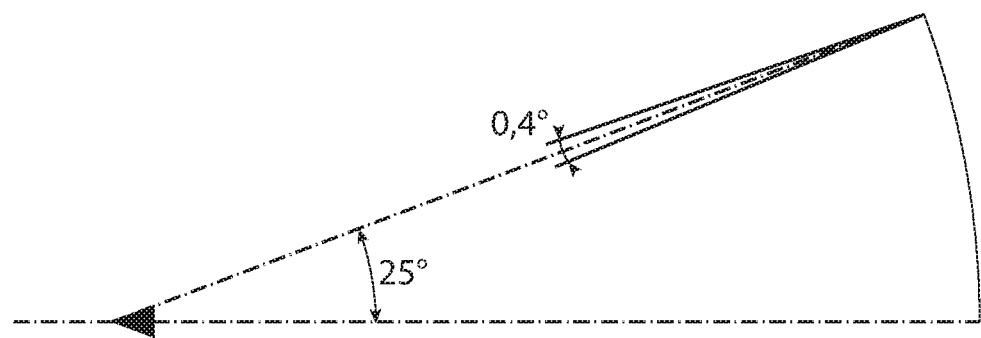
FIG. 16 schematically illustrates the spatial confine of half of the solid angle from which the optical manifold of FIG. 15 receives and carries the light signals.

For example, in the solution illustrated in accompanying FIG. 14A, the transistor Q2 is activated at regular intervals by means of a control signal generated in the microcontroller 32, and the charging voltage of the capacitor C is compared in a comparator 33 with a fixed threshold generated starting from the direct current value +Vcc.

However, in order to avoid a progressive loss of efficiency as the light present in the place where the lighting apparatuses 12 are installed increases (owing to the decreased detection of the light variation produced by the smartphone 11 as the environment light present increases and to the poor sensitivity of the system in strong light conditions, as it is necessary to detect a minimum time variation on a time that is already short in itself), according to the present invention, a better solution is to maintain the charge time of the capacitor C as constant as possible by adaptively varying the comparison threshold or, in other words, making the capacitor C recharge time independent of the contribution of the environmental light.

The technical solution proposed and illustrated in detail in appended FIG. 14A is the creation of a variable threshold of the comparator 33, which is digitally controlled, by the microcontroller 32 using a digital potentiometer 40; this threshold is inversely proportionally linked to the value of absolute luminance measured by the receiver photosensor 13 and appropriately interpreted and resolved in the microcontroller 32.

In this way the difficulty of having to discriminate and identify the charging periods in which the flash 10 is switched on in conditions of strong light is obviated, and the system therefore becomes more accurate and the light variation easily interpretable.

The problem of environment light interference is much more evident if the environmental light is substantially produced by lighting apparatuses characterised by flickering and if the frequency of activation of the transistor Q2 is asynchronous relative to the flickering frequency.

In these situations, since the information is enclosed in capacitor C charge times, the system could interpret the fluctuations of the environment light such as a part of a light command sent by the flash 10 and/or another device having a same function as the smartphone 11.

A solution could be to sample the flickering of the environmental light by memorising the various times in the absence of a light communication and therefore reconstructing the waveform; this approach is however particularly complex and laborious in terms of computation times and circuit complexity.

Figure 20:
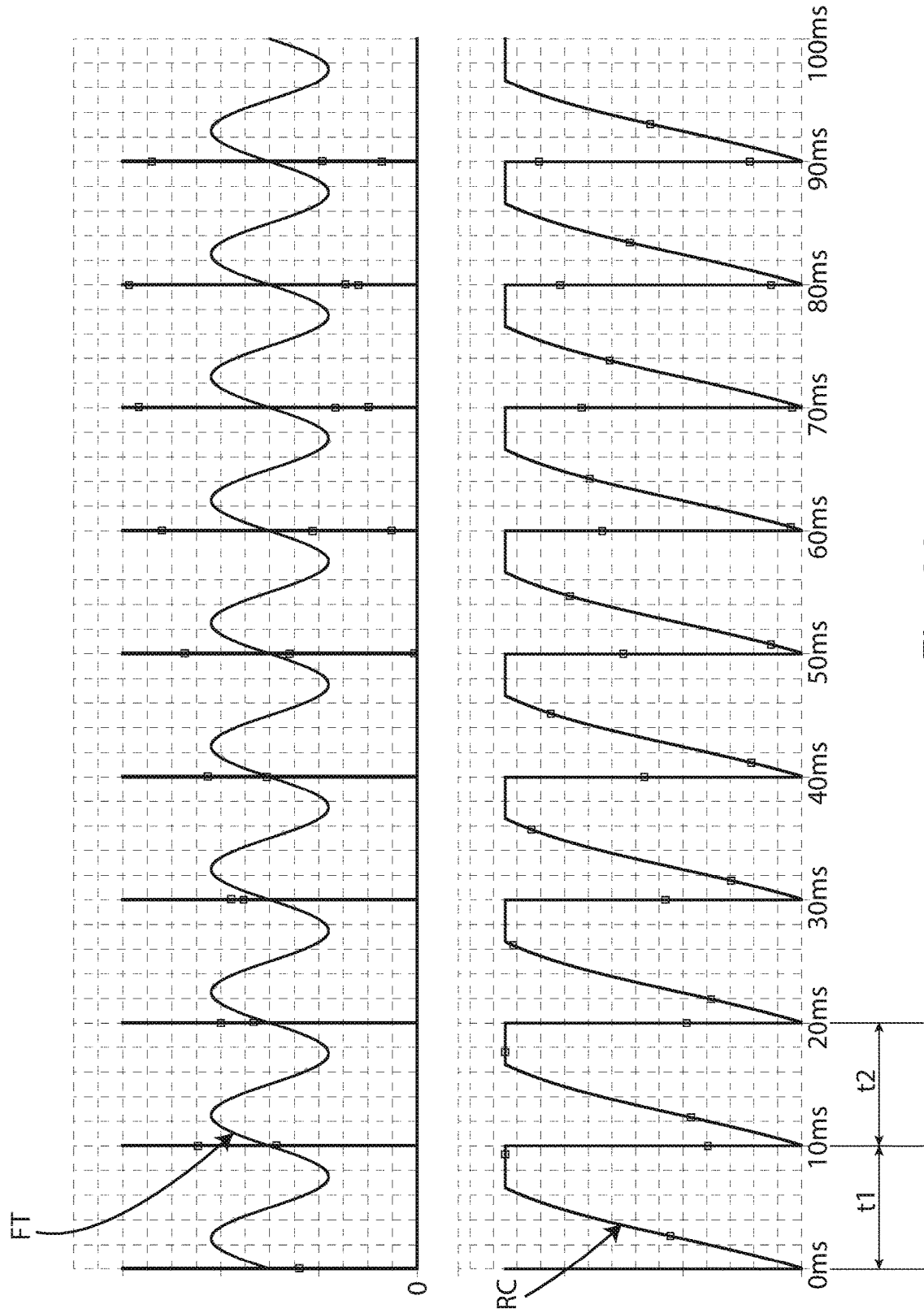
FIG. 20 schematically illustrates a graph showing the profile over time of the supply current in relation to the progress over time of the recharging of the capacitor denoted by C in FIG. 14A, according to the present invention.

Assuming that the supply current of the usual and emergency lighting sources is the same (or at least isofrequential), it is possible to reconstruct, recognise and precisely evaluate the flickering of the interfering light consequent to the grid flickering; according to the present invention, a synchronism is therefore introduced between the frequency of the supply current FT (the profile of which is shown in the graph of FIG. 20) of the emergency lighting apparatus 12 and the switching of the transistor Q2.

In particular, in the graph of FIG. 20, RC denotes the profile of the capacitor C recharging over time, and t1 denotes the activation time of the transistor Q2 synchronous with the grid supply current FT and t2 denotes the recharging time of the capacitor C.

This mechanism makes the recharging times t2 of the capacitor C independent of the light variations received from the optical sensor 18 which are caused by the fluctuations linked to said frequency of the grid current FT.

The measured variations relate to changes in luminosity that cannot be ascribed to flickering and this facilitates communication between the devices of the apparatus.

The technical features of the apparatus and method for the remote control of emergency lighting apparatuses according to the invention clearly emerge from the description, as do the advantages thereof.

In particular, these advantages are represented by:
the peculiarity of the communication technology applied in the lighting sector and in particular, that of emergency lighting;
the adoption of a correction routine of the signal transmitted, in order to reset the coherence of the signal sent to the command effectively desired (to take account of the latency of the flash);
the adoption by the lighting apparatus of a receiving circuit based on a status counter circuit (multi-vibrator) able to carry out the differential operation between the status change frequency in rest conditions (without a signal) and in communication condition (with a signal), so as to minimise the influences of the natural light and the artificial light present in the installation site of the lighting apparatus;
the realisation of a special optical device, intended to collect and direct the luminous signal of the flash of the smartphone to the receiver photosensor, so as to resolve the drawbacks linked to the tracking and directionality of the remote control system.

Lastly, it is clear that numerous other variants might be made to the apparatus and method of the invention, without forsaking the principles of novelty of the inventive idea expressed herein, while it is also clear that in the practical actuation of the invention, the materials, the shapes and the dimensions of the illustrated details can be of any type and can be replaced, according to requirements, by other technically equivalent elements.

What is claimed is:

1. An apparatus for the remote control of lighting apparatuses, comprising:
a transmitter apparatus represented by a flash (10) or display (19) of a smartphone (11) having controlled activation,
a receiver device used as a receiver of digital optical signals (16) which integrates a control, programming and management system managed by a software program (14), and a lighting device (12), which incorporates a receiving circuit comprising a receiver photosensor (13) associated with a decoding and control circuit able to interface with the operating circuits of said lighting device (12) so as to remotely carry out tests and/or functions of said lighting device (12) via said transmitter apparatus, wherein said smartphone (11) actuates optical commands directed at said lighting device (12), in the form of encoded luminous messages of intensity- or duration-controlled sequences of light variations according to a specific optical code and various levels of luminosity, by means of a modulating process of the switching-on and the switching-off of said flash (10) or display (19) of the smartphone (11), wherein an algorithm is configured to reset a correct sequence of said optical commands, which is naturally distorted by times of delay or latency to which said flash (10) and/or display (19) of the smartphone (11) is subjected.

2. The control apparatus according to claim 1, wherein said lighting apparatus (12) integrates a dedicated LED module and/or an LED module intended to supply safety lighting (15) which is controlled in series by an appropriate Mosfet so as to produce a desired digital optical signal.

3. The control apparatus according to claim 1, wherein said transmitter apparatus comprises at least one optical receiver device constituted by a photosensitive element, such as for example a camera (16, 21), programmed for receiving and recording the signal coming from said lighting apparatus (12) as an encoded image.

4. The control apparatus according to claim 1, wherein said optical device is programmed for receiving and recording films synchronised with the signal coming from said lighting apparatus (12).

5. The control apparatus according to claim 1, wherein said photosensor (13) is coupled to an amplifier (20) and to a filter (21), which increase the level of the electrical signal output to said photosensor (13) and select only a frequency band useful for the transmission, an output of which is sent to a comparator (23) and a microprocessor (24).

6. The control apparatus according to claim 1, wherein said photosensor (13) is coupled to a microcontroller (25) comprising an A/D converter (26), a digital memory (27), a delay block (28), a D/A converter (29), a comparator (23) and a decoding member (30), with the aim of simulating a waveform linked to the environmental luminosity and so that at the output of said comparator (23) there is a signal linked to only the light transmitted by said flash (10) and/or display (19) of the smartphone (11).

7. The control apparatus according to claim 1, wherein said receiving circuit includes a multi-vibrator (31) which has a switching frequency controlled by the incident light on said photosensor (13), said multi-vibrator (31) being connected to or integrated in a microprocessor (32, 34), which saves the number of switchings of said multi-vibrator (31) in a specific time range in an absence of communications between said flash (10) and/or display (19) and said lighting apparatus (12) and which detects a variation of the number of switchings during said specific time range at the moment of the sending of light by the flash (10) and/or display (19) of the smartphone (11).

8. The control apparatus according to claim 7, wherein said microprocessor (32, 34) is able to command an unblocking and initialising instant of the time measurement of a capacitor (C), with the aim of completing the charging of the capacitor (C) within a time range of a synchronism period.

9. The control apparatus according to claim 7, wherein said microprocessor (32, 34) is connected to a first transistor (Q2) which is activated at regular intervals by means of a control signal generated in the microprocessor (32, 34) and the charging voltage of said capacitor (C) is compared in a comparator (33) with a variable threshold, which is digitally controlled by said microprocessor (32, 34), so that said threshold is inversely proportionally linked to the value of absolute luminance measured by said photosensor (13).

10. The control apparatus according to claim 9, wherein the frequency of the supply current (FT) of the lighting apparatus (12) is synchronised with the switching of said first transistor (Q2), so that the recharging times (t2) of said capacitor (C) are independent of the light variations received by an optical manifold (18), which are caused by fluctuations linked to said frequency of the supply current (FT).

11. The control apparatus according to claim 1, wherein said photosensor (13) is coupled to an optical manifold (18) which conveys and amplifies, on said photosensor (13), a quota of said luminous signal produced in space by said flash (10) and/or display (19) of the smartphone (11), so as to direct said luminous signal unequivocally to a single lighting apparatus (12) in the presence of a plurality of lighting apparatuses (12) in a specific area.

12. The control apparatus according to claim 1, wherein said flash (10) and/or said display (19) of the smartphone (11) actuates a cyclical series of switching-on and switching-off with a frequency of a few tens of Hz.

13. The control apparatus according to claim 1, wherein said smartphone (11) is able to receive and record encoded luminous messages transmitted by said lighting apparatus (12) via a LED transmitter module (15), which sends the data of said lighting apparatus (12) to a receiver device (16, 21) of said smartphone (11), which enables acquiring images of said lighting apparatus (12).

14. The control apparatus according to claim 13, wherein said smartphone (11) is able to receive and record encoded luminous films transmitted by said lighting apparatus (12).

15. The control apparatus according to claim 1, wherein said optical code identifies a transition from a switched-off status and a switched-on status (10) of the smartphone (11) as bit=0 and a transition from a switched-on status to a switched-off status of said flash (10) of the smartphone (11) as bit=1, said optical commands being defined as a sequence of a specific number of bits.

16. A control method for the remote control of lighting apparatuses, wherein each of said lighting apparatuses comprises:
   a transmitter apparatus represented by a flash (10) or display (19) of a smartphone (11) having controlled activation,
   a receiver device used as a receiver of digital optical signals (16) which integrates a control, programming and management system managed by a software program (14), and
   a lighting device (12), which incorporates a receiving circuit comprising a receiver photosensor (13) associated with a decoding and control circuit able to interface with the operating circuits of said lighting device (12) so as to remotely carry out tests and/or functions of said lighting device (12) via said transmitter apparatus, and wherein said smartphone (11) actuates optical commands directed at said lighting device (12), in the form of encoded luminous messages of intensity- or duration-controlled sequences of light variations according to a specific optical code and various levels of luminosity, by means of a modulating process of the switching-on and the switching-off of said flash (10) or display (19) of the smartphone (11), and wherein an algorithm is configured to reset a correct sequence of said optical commands, which is naturally distorted by times of delay or latency to which said flash (10) and/or display (19) of the smartphone (11) is subjected,
wherein said control method includes the following steps:
   conversion from a sequence of bits into a modulation of said flash (10) of the smartphone (11) and, therefore, into periods of switching-on and switching-off of said flash (10) according to the determined optical code and via an autonomous thread that is separate from the main management thread of said software program (14),
   analysis of the characters of a string, so as to decide, on the basis of the value of "0" or "1", which transition of said flash (10) from switching-on to switching-off or from switching-off to switching-on, to carry out.

17. The method according to claim 16, wherein said software program (14) includes an algorithm, which introduces, within said sequence of optical commands, an estimate of latency times starting from a moving average of the latency times measured by a first change of status of said flash (10) of the smartphone (11).

18. The method according to claim 17, wherein said latency times on a specific smartphone (11), both during switching-on and switching-off of the flash (10), are substantially identical and the instructions carried out in sequence within a generating thread of an optical command have a negligible duration with respect to the software switching-on and switching-off commands of said flash (10).

19. The method according to claim 17, wherein said time estimate for latency times is carried out by calculating the difference between the time detected following the carrying out of the switching-on or the switching-off command and the time detected prior to the carrying-out of said switching-on and switching-off command, after having acquired variable time passages from both during the carrying out of an instruction preceding said switching-on command or switching-off command of a light source integrated in the smartphone (11), and during the carrying out of an instruction subsequent to said command so as to obtain respective delay variables for each switching-on or switching-off of said light source, which are averaged, via an average calculating routine, with said variables of time passages, with the aim of defining average values deriving from the continuous average of said delay variables detected at each switching-on and switching-off cycle of said light source.

20. The method according to claim 19, wherein said absolute average values are used at each switching-on and switching-off cycle of said light source in the following way:
   if a first average switching-on value of said light source is greater than a second average switching-off value of said light source, a calculation is made of a first absolute value given by the difference between said first average switching-on value and said second average switching-off value;
   if a first average switching-on value of said light source is lower than a second average switching-off value of said light source, a calculation is made of a second absolute value given by the difference between said second average switching-on value and said first average switching-off value.

* * * * *